United States Patent [19]
Joynson et al.

[11] Patent Number: 5,107,272
[45] Date of Patent: Apr. 21, 1992

[54] RADAR SYSTEM EMPLOYING INJECTION LOCKED TRANSMITTER STAGE

[75] Inventors: David W. Joynson; Ian J. White, both of Hertfordshire, England

[73] Assignee: The Marconi Company Limited, United Kingdom

[21] Appl. No.: 451,713

[22] Filed: Nov. 27, 1989

[30] Foreign Application Priority Data

Nov. 7, 1988 [GB] United Kingdom ............... 8826028

[51] Int. Cl.$^5$ .................... G01S 7/03; H03B 9/10; H03L 7/087
[52] U.S. Cl. .................... 342/199; 342/201; 331/5; 331/22; 331/47
[58] Field of Search .............. 342/199, 200, 201; 331/5, 22, 31, 47

[56] References Cited

U.S. PATENT DOCUMENTS

| | | | |
|---|---|---|---|
| 2,820,197 | 1/1958 | Donul, Jr. .................... | 331/5 X |
| 2,860,246 | 11/1958 | Jakubowics .................... | 331/31 X |
| 3,290,678 | 12/1966 | Carlsson .................... | 342/199 |
| 3,358,282 | 12/1967 | Wasterlid .................... | 342/201 |
| 4,472,718 | 9/1984 | Ohashi et al. .................... | 342/201 X |
| 4,547,775 | 10/1985 | Wehner et al. .................... | 342/201 |
| 4,809,004 | 2/1989 | Brandao et al. .................... | 342/199 |
| 4,912,432 | 3/1990 | Galani et al. .................... | 331/31 X |

*Primary Examiner*—Gilberto Barron, Jr.
*Attorney, Agent, or Firm*—Kirschstein, Ottinger, Israel & Schiffmiller

[57] ABSTRACT

A radar transmitter chain employing injection locked oscillator, e.g., a magnetron, as an output stage. Problems arise with maintaining the injection locking bandwidth centered on the radar source transmit frequency. This alignment is maintained by allowing the magnetron (38) free running frequency to drift, along with its injection locking bandwidth and then to force the radar source frequency (30) to follow the magnetron frequency. A phase difference measurement (44) between the injection signal (35) and the magnetron output signal (37) provides the control for a feedback loop (60) which may control a tunable VCO (48) or selection from a bank of fixed frequency oscillators (78).

9 Claims, 6 Drawing Sheets

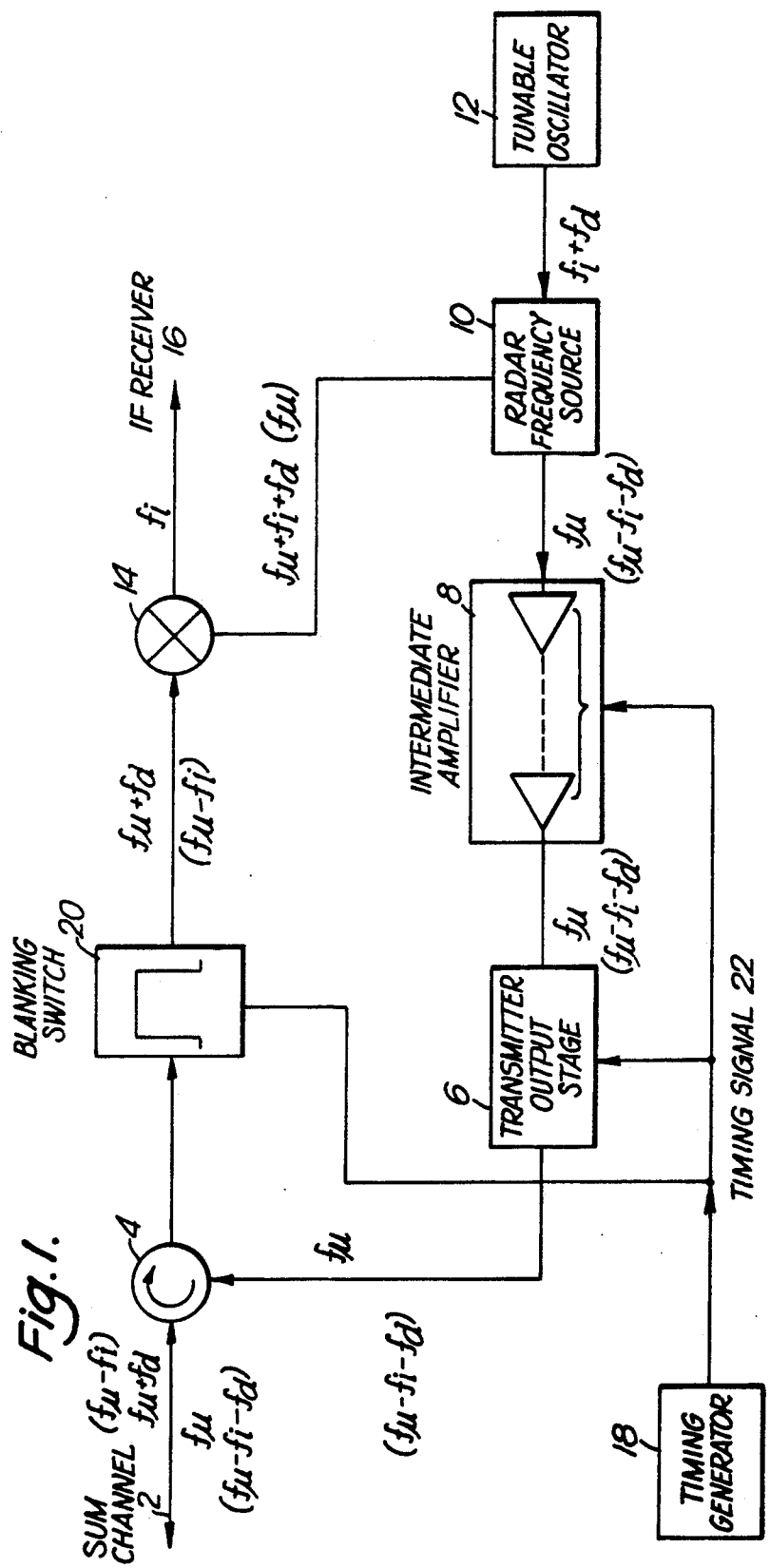

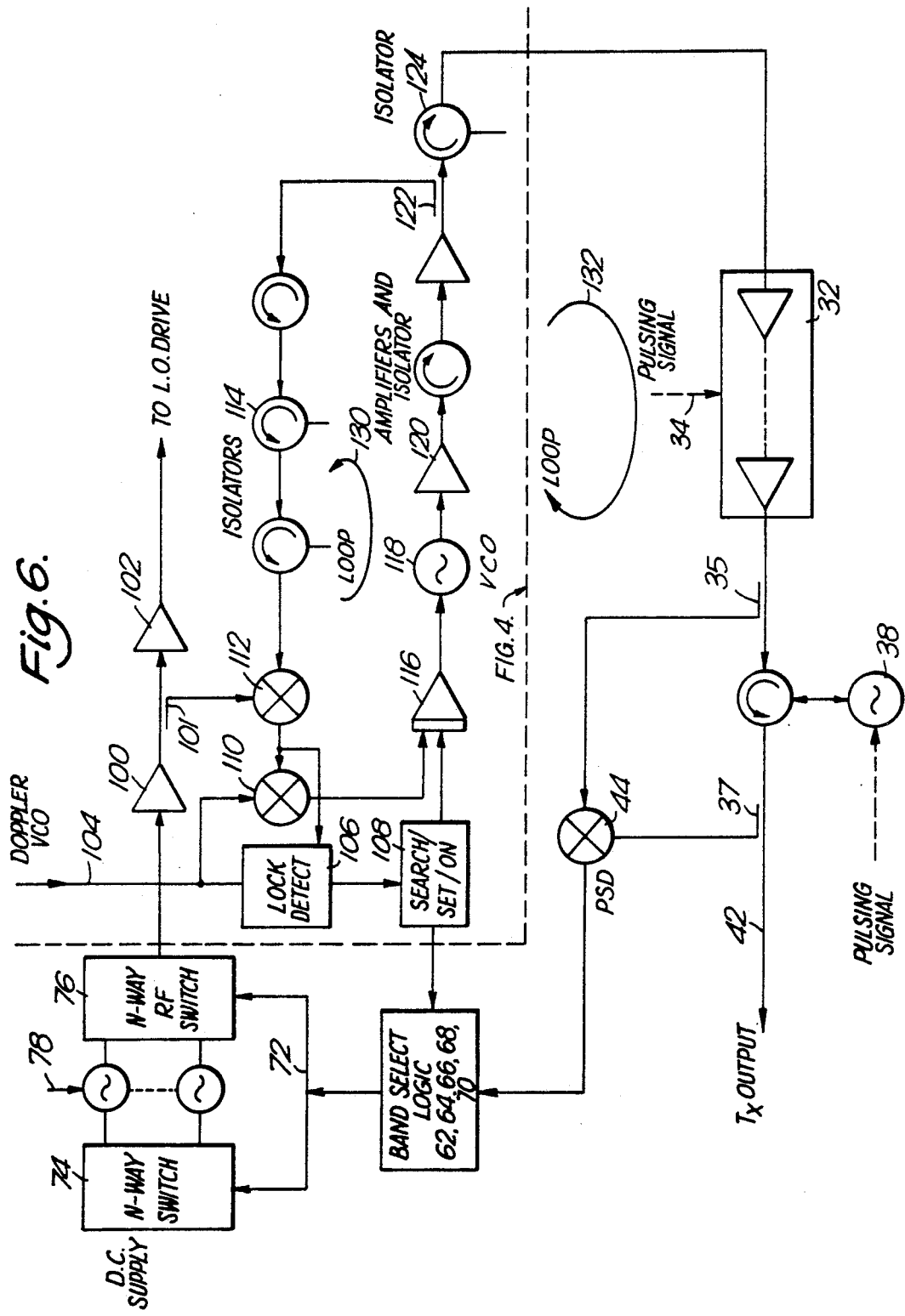

RADAR SYSTEM EMPLOYING INJECTION LOCKED TRANSMITTER STAGE

BACKGROUND OF THE INVENTION

The design of a coherent radar frequency transmitter is an important element in a range of modern radars. Coherent radar transmission consisting of either continuous wave or pulsed operation is the basis of doppler radars used primarily against aircraft targets. The signal processing of the radar is able to make use of the coherent nature of the transmitted signal to separate the target return from interfering reflections particularly from ground clutter. Continuous wave and pulse doppler radars are used by aircraft and missile seekers in air to air attack.

In order to provide a coherent signal it is known to provide a low power, spectrally pure source which is amplified through an amplifier chain consisting of between one and very many amplification stages to give the required power output. These stages may consist of wideband amplifiers or injection locked oscillators acting as amplifiers where the characteristics of the pure input signal are imposed on the injection locked oscillator to give a spectrally coherent output signal.

An example of a high gain, single stage amplifier is a Travelling Wave Tube. These devices and their power supplies are particularly large, so for small radar and missile applications a chain of lower gain amplifiers is often preferred. Examples of these lower gain devices are solid state amplifiers (FET and IMPATT) and tubes such as magnetrons and cross field amplifiers.

The critical component in the transmitter chain will be the highest power, output stage and it is particularly important to get this device to operate at maximum efficiency and with the minimum of extra noise added to the input signal. If the output stage is an injection locked oscillator then it is important to ensure that the injection locking signal is not too close to the edge of the injection locking bandwidth of the output stage, otherwise extra power may be needed to injection lock the oscillator and extra noise will be added to the transmitted signal. An example of such a device is a high mean power, injection locked magnetron.

It is found in practical devices that the injection locked output stage is likely to have an injection locked bandwidth that is smaller than the system bandwidth. Moreover drifts in the oscillator frequency with age or temperature may move the centre frequency of the device over quite large ranges often larger than the injection locking bandwidth of the device. This may lead not only to degradations in performance but the complete failure of the transmitter chain if the input signal to the output stage is no longer within its bandwidth.

In order to avoid such problems, extensive development can be undertaken on the higher power output stages to increase the injection locking bandwidth and reduce drifts and uncertainties. However such work is very expensive and variations in frequency will still occur.

SUMMARY OF THE INVENTION

The purpose of the present invention is to provide an injection-locked transmitter chain that is capable of operating with current devices in such a way as to accommodate transmitter drifts and to maintain a transmitter chain spectral purity and efficiency of high quality.

According to the present invention, in a coherent radar system employing an injection locked oscillator for the generation of a transmitted signal, the oscillator having an injection locking bandwidth within which the oscillator output signal is locked in frequency to the injection signal, the system includes a radar source from which the injection signal is derived and feedback means for controlling the frequency of the radar source in dependence upon the phase difference between the injection signal and the oscillator output signal so as to reduce the phase difference and tend to maintain the injection signal frequency at the centre of the injection locking bandwidth.

The feedback means may comprise a loop including a phase sensitive detector and a tunable voltage controlled oscillator constituting part of the radar source, the radar source frequency being continuously variable in response to the phase difference.

A fixed frequency oscillator having a relatively pure spectrum is preferably coupled into the loop to impose its spectrum on the injection signal. The radar source may thus include a relatively pure spectrum fixed frequency oscillator and a further voltage controlled oscillator controlled in a further feedback loop to produce an output frequency equal to the difference between the fixed frequency and the tunable voltage controlled oscillator, the output frequency being the radar source frequency, and the spectrum of the fixed frequency oscillator being imposed upon the radar source signal.

Alternatively, the radar source may comprise a plurality of fixed frequency oscillators having sequential operating frequencies separated by a fraction of the injection locking bandwidth, selection means for selecting one of the fixed frequency oscillators to determine the frequency of the injection signal, the selection means being responsive to the phase difference in a feedback loop to select the fixed frequency oscillators so as to tend to reduce the phase difference. The frequency of the selected fixed frequency oscillator may then constitute the injection signal frequency.

Alternatively, where a doppler radar system includes means providing an intermediate frequency signal from a received signal and a local oscillator signal, the frequency of the selected fixed frequency oscillator may constitute a local oscillator frequency for the system, the system including a further feedback loop including a voltage controlled oscillator providing the injection signal frequency, the voltage controlled oscillator being controlled in dependence upon the difference between, on one hand the doppler shifted intermediate frequency, and, on the other hand, the difference between the local oscillator frequency and the injection signal frequency.

In a frequency agile radar system as aforesaid, wherein the injection locked oscillator may be tunable over the range of frequency agility the radar source may include a plurality of fixed frequency oscillators having operating frequencies throughout the range of frequency agility, the system including selection logic means for selecting the fixed frequency oscillators on a random or predetermined basis and selecting the output frequency of the injection locked oscillator in correspondence with the selected fixed frequency oscillator, the system further including a first feedback loop including a phase sensitive detector responsive to the phase difference to control a tunable voltage controlled oscillator, and a further feedback loop including a further voltage controlled oscillator providing the radar source frequency, the further voltage controlled oscillator being controlled in response to the difference between the frequency of the selected fixed frequency oscillator and the frequency of the tunable voltage controlled oscillator, the arrangement being such that for each selected fixed frequency oscillator the tunable voltage controlled oscillator is controlled to maintain the radar source frequency within the injection locking bandwidth of the injection locked oscillator.

BRIEF DESCRIPTION OF THE DRAWINGS

Several embodiments of coherent radar system in accordance with the invention will now be described, by way of example, with reference to the accompanying drawings, of which:

FIG. 1 is a simplified block diagram of the significant sum channel parts of a known radar transmitter/receiver;

FIG. 6 shows a further alternative in which control of the injection frequency is, as in FIG. 4, by way of selection from a bank of fixed frequency oscillators but in which, in contrast to FIGS. 3 and 4, makes the local oscillator frequency directly equal to the radar source frequency and makes the transmitted frequency a function of the doppler shift frequency.

DETAILED DESCRIPTION OF THE PREFERRED EMBODIMENTS

Figure 2A:
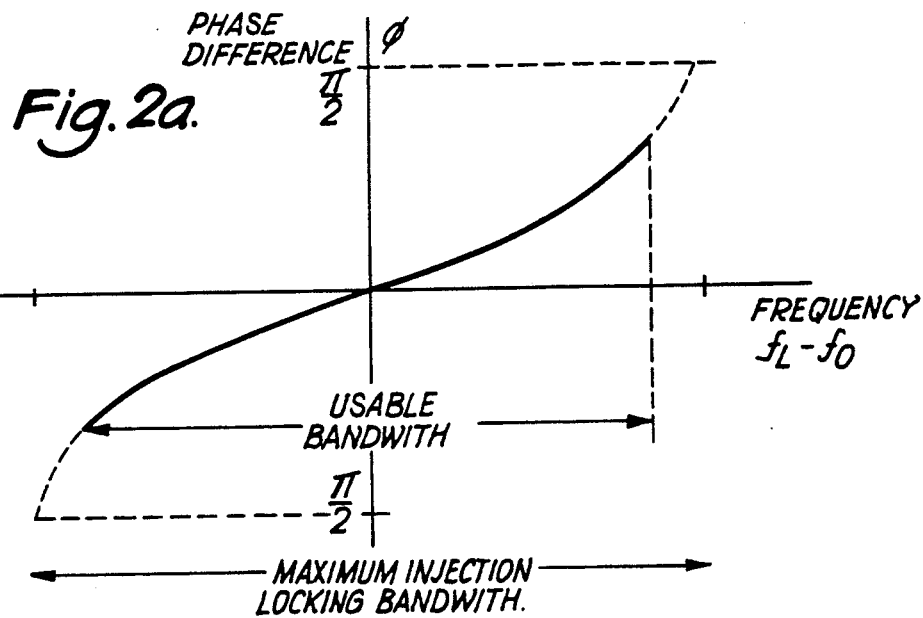
FIG. 2(a) is a graph of phase difference against operating frequency for an injection locked oscillator, the phase difference being between the injection locking signal and the output signal.

The principles discussed in this document apply equally well to both continuous and pulsed operation, although for convenience in the description this distinction will not always be explicitly made.

An example of a radar system sum channel and particularly the transmitter chain using a number of intermediate amplifiers and/or injection locked oscillators is shown in FIG. 1. The principle of operation is as follows.

The transmitter and receiver operates through a common channel (2) where the output and input sum signals are separated by the duplexing element (4). In FIG. 1 this is shown as a circulator, although a switch could be employed instead. The frequency indications without brackets apply directly to this FIG. 1. The alternative indications in brackets apply to an embodiment shown in FIG. 6 and described later. The transmitted signal at a frequency denoted by $f\mu$, comes from a transmitter output stage (6) and is preceded by a chain of intermediate amplifiers (8). The number of intermediate stages varies from zero, for a very high gain output stage (6) (e.g. a TWT) to a large number N. Values of N equal to three and four are quite practical and higher numbers are possible. The coherent nature of the amplification processes is emphasised by the use of the frequency $f\mu$ to denote the same radar frequency at each stage in the transmitter chain.

The spectrally pure radar frequency (RF) source (10) is the origin of the required signal and one of its outputs is used as input to the transmitter chain (8). A second output is offset from the first by the use of a tunable oscillator (12). This output is used as a reference in an RF mixer (14) to mix the received signal down to an intermediate frequency (IF) for further processing in the IF Receiver (16).

To maintain coherent operation it is important that the frequency throughout the transmitter chain, and its spectral purity are maintained and that the two outputs of the RF source (10) are coherent. In particular if the transmitter output stage should drift so that it can no longer amplify the input signal ($f\mu$) the whole operation of the radar will cease.

In the example shown, the radar operates in a pulsed mode of operation. A timing generator (18) is used to output signals (22) which switch the various transmitter stages on and off at a prescribed pulse repetition frequency and pulse duration. In addition when the transmitter is on, the blanking switch (20) in the RF Receiver is closed in order to protect the receiver. Such a coherent transmitter chain can operate with the timing signals removed and hence could use continuous wave (CW) operation provided that the elements of the chain are suitable chosen. In such a case the tunable oscillator (12) may be adjusted so that adequate separation of transmitted and received signal is achieved or the transmitter channel and sum receive channel can be separated.

In any of the above cases, whether the transmitter is pulsed or CW, and whether the transmitter and receiver are duplexed together or exist as separate channels, the principles of the coherent transmitter chain and receiver embodied in elements (6) to (12) and their outputs remain the same.

The principle of an injection locked amplifier chain is that one or more of the components in the transmitter chain will be operating as injection locked oscillators rather than as amplifiers. Devices that operate in this way include magnetrons and IMPATT devices. In order to injection lock an oscillator it is necessary to provide an input signal that is close to the "free-running frequency" of the oscillator within the "injection locking band". If this occurs the spectral purity of the input signal which is designed to be very good is imposed on the oscillator output, and this output is at the input frequency rather than at the free-running frequency of the oscillator. To obtain a coherent transmitter chain as shown in FIG. 1 and described above it is necessary to maintain the signals within the injection locking band of the appropriate oscillators which are thus injection locked and are acting as injection-locked amplifiers.

The various devices are better if they are locked in the middle of their injection locking bands, and as the input signal moves towards the edge of the band a phase difference is introduced between the input and output signals. Once the phase difference reaches $\pi/2$ radians the oscillator is no longer properly locked and in fact a degradation of locking gain and noise occurs well before this point. For any injection locked oscillator at reasonably high injection locking gain:

$$\sin \phi = (W_1 - W^1)/K$$

Where $\sin \phi$ is the phase difference between the input and output signal in the steady state (i.e. after any pulse start up transients have died away), $W_1$ is the angular frequency of the locking signal, $W^1$ is the free-running angular frequency and K is a function of the device locking bandwidth, the external load and the type of device.

A graph summarising the above situation is shown in FIG. 2a.

In a continuous wave transmitter the phase $\phi$ will be set up soon after transmitter switch on and thus will vary only slowly with the variation in parameters $W_1$ and $W^1$ with time. In a pulsed system there is a transient at the beginning of each pulse which must be taken account of either by ignoring the start-up period or by averaging a sufficiently large period.

Figure 2B:
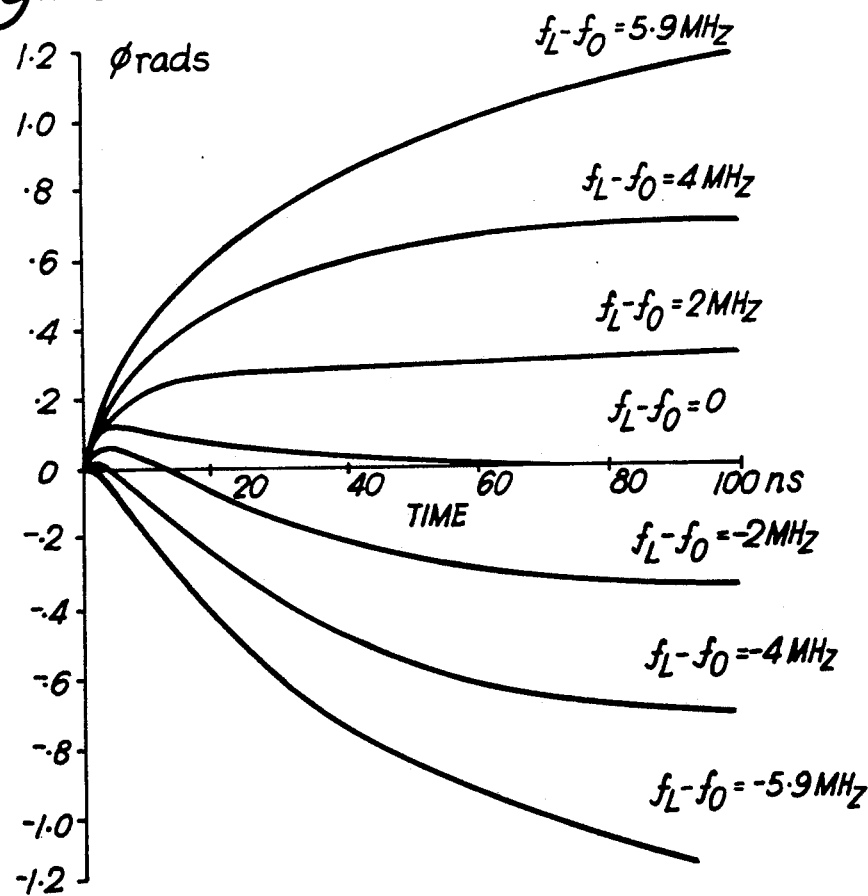
FIG. 2(b) is a graph of the above phase difference varying with time from energising, i.e. in a pulsed operation.

An example of phase transients at the beginning of injection locked pulses is shown in FIG. 2b, taken from an article "Spectra of short, locked magnetron pulses" B. Vyse and J. M. Gissing. TRANS IEEE Vol. ED-18 No. 3 March 1971 where the theory of injection locked magnetrons is discussed. In this figure a specific design of magnetron was investigated and the start-up phase transient for different values of $f_L - f_O$ is plotted. $F_L$ is the input frequency and $f_O$ is the free-running frequency of the magnetron. The phase transient always starts positive and then tends to the limiting value given by the above equation, i.e. in the particular case:

$$\sin \phi = (f_L - f_O)/6.2 \text{ MHz}$$

The length of the phase transient is up to 100 msecs, so for any pulse longer than this the steady state is achieved in which the phase error can be used to determine the injection locking state of the magnetron. A similar relationship is found for other injection locked oscillators where the length of the transient depends on the injection locking bandwidth of the oscillators. In the discussion below the pulses will always be long enough such that the phase has essentially settled. In practice if shorter pulses are used the measurement of the phase could be compensated by scaling to give a realistic assessment of the final phase, so that the designs are equally applicable to this type of pulse length, as well as to CW systems as already explained.

In the design of injection locked transmitter chains, as shown in FIG. 1 and described above, the principle used is to define a frequency at which the spectrally pure RF source operates and then to line-up the amplifiers and oscillators so that these components are able to amplify this signal faithfully. For the oscillators this means that the signal must always lie within the injection locking band of the oscillator and drifts must be minimized and bandwidths maximized in order to make this possible.

The purpose of the embodiments described below is to make use of the above observations to relax this requirement in the high cost, high power devices. In practice the technique will be used on the narrowest band/highest drift rate device which is assumed to be for this discussion the output stage, although the technique could equally well be used on the intermediate stages instead. The most difficult device to injection lock will be the one with the highest ratio R of total frequency drift D, (over all relevant environmental and operating conditions), divided by the injection locking bandwidth B, i.e.

$$R = D/B$$

The method employed in these embodiments is to allow the device with the highest R value of (assumed to be the output stage) to define the frequency of operation of the system and to line up the rest of the system with this component. By doing this the following advantages are found:

(a) Transmitter chain operates successfully for output device drifts substantially larger than the injection locking bandwidth of the narrowest band stage.

(b) The injection locking frequency can be chosen to optimise transmitted power and minimize added noise.

(c) Major developments on the higher power and thus higher cost, components are avoided.

(d) Transmitter chain locking is robust to perturbations since it is part of a closed loop system.

A basic feature of the embodiments to be described is the use of the phase difference between the input and output signal of the injection locked oscillator to determine the relative frequency offset between the free running and injection locked frequencies. This phase difference is used as part of a control loop to keep the injection locking frequency within the oscillator bandwidth and to minimise added noise as explained above.

Figure 3:
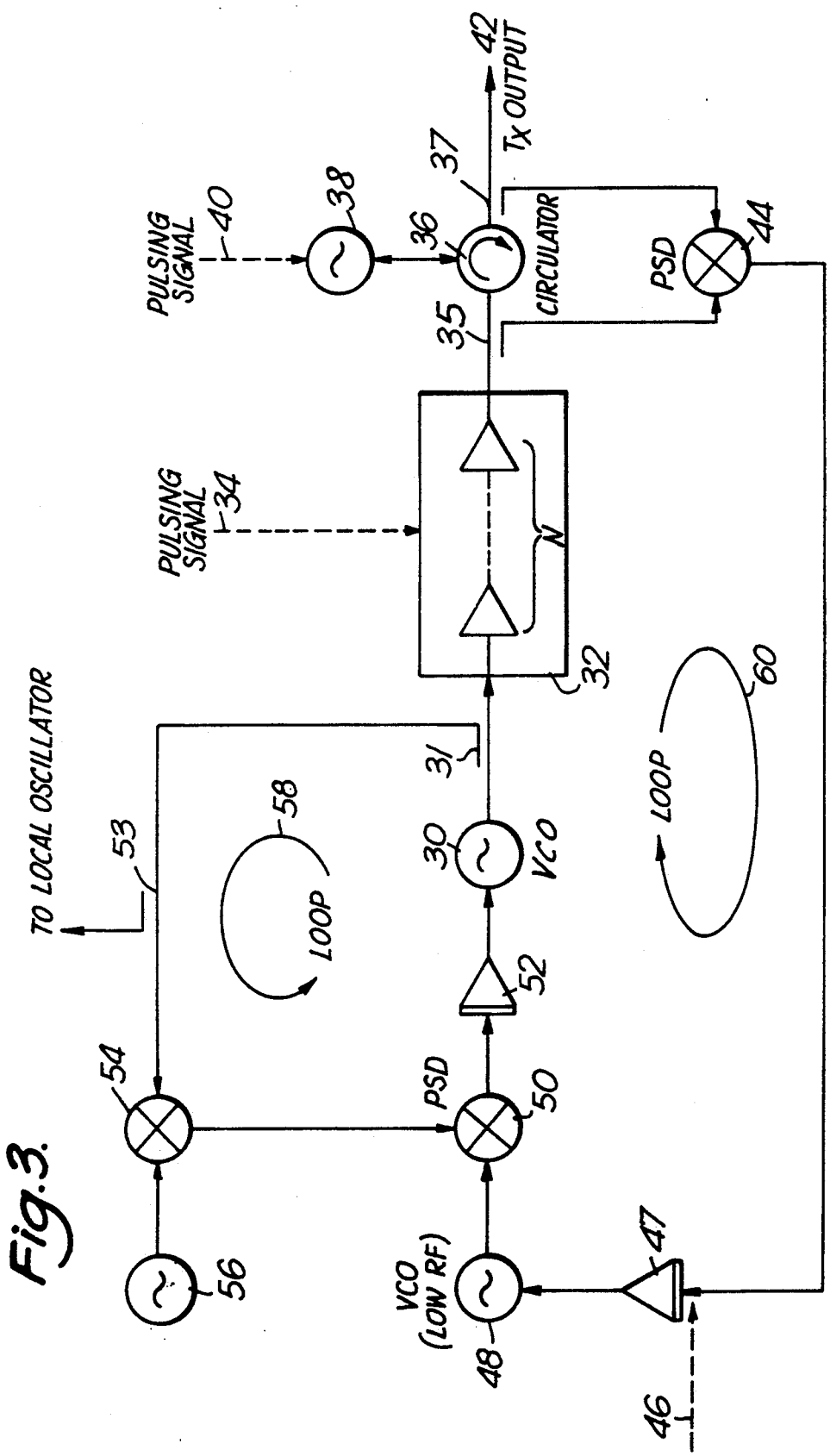
FIG. 3 is a block diagram of the transmitter components of a radar system showing the injection locked oscillator controlling the injection frequency by way of a feedback loop and a tunable voltage controlled oscillator (VCO)

In the implementation shown in FIG. 3 a reference oscillator is tuned continuously to achieve this objective. An alternative design described subsequently uses a number of switched oscillators.

Referring now to FIG. 3, a high power oscillator (38) is used in injection locked mode by using the input signal to the circulator (36) as the injection signal. The oscillator output passes through the same circulator (36) to the transmitter output (42) which goes to the antenna for free space transmission by way of a circulator not shown. The input signal to the oscillator (38) originates in a fundamental frequency VCO (30) and is amplified (32) by a number of amplifiers (N) which number can vary from zero upwards. These amplifiers could also include injection locked oscillators. The two output stages (32) and (38) may operate in a continuous wave mode, or may be pulsed, and the pulsing inputs are shown in (34) and (40) for the intermediate and output amplifier stages respectively. The output oscillator may typically be a magnetron operating in an injection locked mode.

In order to maintain the input frequency in the centre of the magnetron band two couplers are used, one, 35, on the input side of the magnetron and one, 37, on the output side. The two RF signals from these couplers are then input to a phase sensitive detector (PSD) (44), the output of which is proportional to the product of the amplitudes of the two input signals (which are relatively well known) multiplied by $\sin \phi$ where $\phi$ is the phase angle between the two signals. As discussed above with reference to FIG. 2, the phase difference indicates the relative position of the injection locking frequency within the magnetron band.

This signal is now input to the integrator (47) which is able to smooth out fluctuations in the PSD output. If the transmitter chain is pulsed then a sample and hold (46) may be needed on the input to the integrator (47) to ensure that the valid phase outputs of the PSD (44) are not contaminated with unnecessary noise inputs.

The output of the integrator is then used, with a scaling defined to give an appropriate closed loop gain (see below), to control the frequency of a radar frequency VCO 48. This oscillator which is outside the closed loop 58 must have good noise sidebands as a lower radar frequency is used than the frequency needed to injection lock the transmitter chain. This is mixed with a signal of substantially the same frequency in a phase sensitive detector (50) and the output, low frequency/video, signal is integrated in an integrator (52). The output of the integrator is used to control a voltage controlled oscillator (30) at the required frequency to injection lock the transmitter chain and to centre the frequency in the injection locking band. A coupler (31) takes off some of this signal to mix with a fixed frequency, spectrally pure oscillator (56) in the mixer (54) which gives the required reference frequency at the PSD (50).

The purpose of the loop 58 is to impose the 'close in' spectrum of the oscillator (56), which, being of fixed frequency can be made spectrally very pure, onto the 'close in' spectrum of the VCO (30), and to filter out the other sideband. Since the VCO (30) is tunable, its spectrum will be less pure than that of the fixed frequency oscillator (56). The spectrum within the bandwidth of loop 58 is thus determined by the better, fixed frequency oscillator (56). Another coupler (53) is provided to give the reference frequency for the first local oscillator for the receiver (not shown).

The purpose of loop 60 is to control the frequency of the injection locking signal to within the injection locking band of the high power magnetron (38) by varying the VCO (48). Ideally the signal would be controlled to lie near the centre of the band and this gives potentially better added noise, higher gain and some increase in efficiency. The bandwidth of this loop is relatively low since it is intended to track out drifts in the magnetron. Typical maximum drifts of (say) 5 to 10 MHz/second which might occur during an initial warm up phase could be followed, to a 0.5 to 1 MHz accuracy, with a loop gain of about 10 rad/sec, i.e. 1.5 Hz. Even for variations in typical drift rate and required accuracy, it can be seen that the bandwidth will be relatively low, of the order of a few Hertz.

A typical injection locking bandwidth might range from 5 MHz (say) to 50 MHz, so to keep the signal within the middle ten percent of this bandwidth requires gains of the order of those above.

With this design, the advantages of maintaining high quality injection locking of the output device can be obtained without major development programmes, over a wide range of varying environmental, warm-up and ageing conditions.

An alternative implementation of the same principle of operation is possible. In this design the reference oscillator is not tuned continuously as in the above design but is varied in steps. This is achieved by the availability of a number of spot frequencies from the fundamental RF source or a number of different RF oscillators which can be selected by the appropriate circuitry. Once again the means for selecting the RF oscillator whose frequency is closest to the centre of the injection locked output stage uses the phase difference between the input and output signals of this injection locked oscillator.

Figure 4:
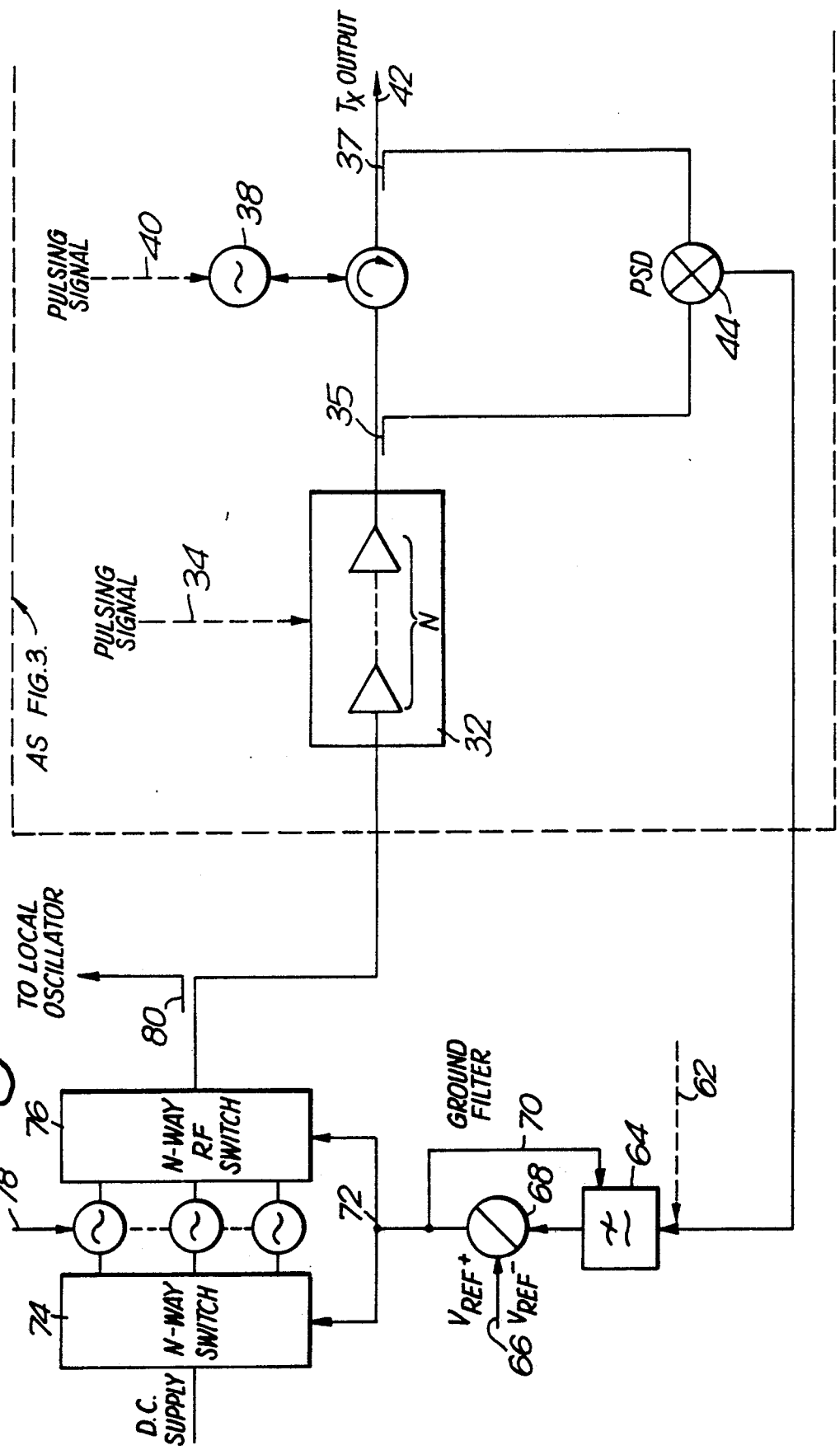
FIG. 4 is a similar block diagram but showing control of the injection frequency by way of a feedback loop and selection of one of a bank of fixed frequency oscillators.

Such an embodiment is now described with respect to the block diagram shown in FIG. 4.

The intermediate amplifiers, injection locked oscillator, couplers (32-38) and phase sensitive detector (44) operate in the same manner as already described in relation to FIG. 3. The output of the phase sensitive detector (44) is used slightly differently.

In this case the output is filtered in a low pass filter (64) to give an average phase error between the input and output signals of the injection locked magnetron. The input may be sampled and held (62) if necessary, as may be required in a pulsed system, although the principles of operation hold whether the input to the filter is thus sampled or not and whether the transmitter output is pulsed or uses a continuous wave operation.

The output of the low pass filter is compared to positive and negative reference voltages ($V_{ref}+$, $V_{ref}-$) (66) in a comparator (68). These reference voltage levels are set such that switching between the reference oscillators will take place for a given frequency offset between the free-running frequency of the injection locked magnetron oscillator and its input frequency.

If the positive or negative reference level is crossed then a new RF oscillator is selected by the selection control lines (72). A number (N) of RF oscillators can be selected (78) using the N-way switches (74) and (76). The selection of the output of the oscillator is done by switch (76).

Because of the residual power which will appear as a spurious signal resulting from a powered oscillator at the wrong frequency, the input power is also switched so that only the chosen oscillator is powered up. This selection is done using the N-way switch (74). When the comparator is triggered the output of the filter (64) is grounded so as to ensure that the RF oscillator is not switched again inadvertently.

The output of the selected oscillator is the input to the transmitter chain as in FIG. 3, through the intermediate amplifier chain (32) and the injection locked oscillator (38). In addition some of the transmitter reference signal is coupled off via the coupler (80) to give a reference for the local oscillator of the radar receiver so that coherent operation can be maintained.

As a result of the design in FIG. 4, when the output stage magnetron oscillator center frequency drifts, the appropriate fixed frequency RF oscillator which is closest to the center of the magnetron injection locking band is automatically selected. The separation of the RF sources must clearly be less than the injection locking band, and the overall frequency range of the sources must be greater than the expected transmitter drift. The number of sources then depends on how close to the center frequency of the magnetron the input frequency is desired to be maintained and the compromise between system complexity and overall transmitter chain performance.

There are extensions and alternatives to the above designs. The main extension is that which includes the facility to operate with a selection of fixed frequency oscillators as in FIG. 4 together with a frequency tunable transmitter as in FIG. 3.

This embodiment is illustrated for a transmitter chain that is frequency agile. In frequency agile operation for a coherent CW or pulsed system, coherence is maintained for a period over which coherent integration takes place and then the radar frequency is altered by a discrete step. This process can be repeated over a number of spot frequencies.

If a frequency agile transmitter chain using an injection locked oscillator is used then the center frequency of the magnetron may be periodically changed and at the same time the radar frequency source is changed to ensure that the two frequencies are similar. In this way a frequency agile bandwidth can be used that is higher than the injection locking bandwidth of the injection locked oscillator.

It is also possible that the output oscillator frequency will start to drift with time so that the two means of frequency selection namely:

tracking out of frequency drifts discrete steps to accommodate frequency agility need to be implemented together.

This design will be described with reference to FIG. 5 where the continuous tuning design of FIG. 3 is extended to include frequency agility.

Figure 5:
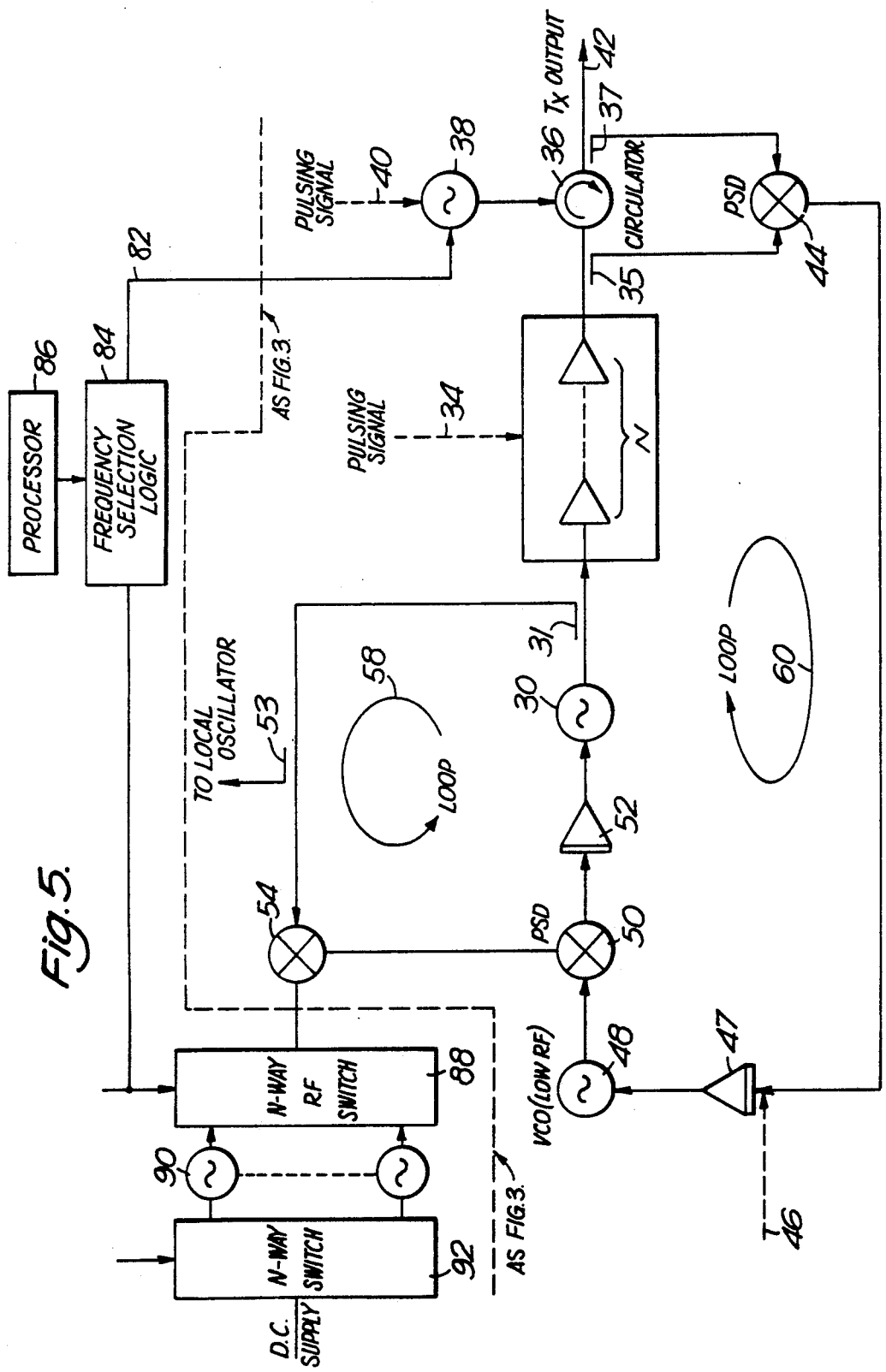
FIG. 5 shows a system similar to that of FIG. 3 but having an externally controlled selection of basic operating frequency and the feedback system of FIG. 3 for fine control of the operating frequency relative to the injection locking bandwidth.

Most of FIG. 5 is the same as FIG. 3. The differences lie in the presence of frequency selection logic, the selection of the RF oscillators and the tuning of the output injection locked magnetron oscillator.

As shown, the frequency selection logic (84) is controlled by commands (86) from a mode controller of digital signal processor or other controlling device. The frequency selection logic then outputs (82) the correct signal to select the appropriate center frequency of the injection locked magnetron (oscillator) (38) and the fixed frequency oscillator (90) closest to the center of the injection locked magnetron band. This is done by way of an N-way RF switch (88). In common with the previous design (FIG. 4) d.c. power inputs to the unused oscillators are also disabled using the switch (92).

When a discrete change in frequency takes place there may be an offset between the chosen oscillator (90) and the selected center frequency of the magnetron (38). This offset results in a phase difference at the PSD (44) and the loop 60 then 'pulls' the oscillator (48) so that the resultant frequency is in the center of the band. In this case the time constant of the loop must be shorter than that in FIG. 3 since it must take out any drifts or errors in a small fraction of the coherent integration time. If a typical coherent integration time is 10 msecs then the pull-in should be complete in (say) 1 msec so a typical time constant is 0.1 msecs. This makes the detailed design of the loop somewhat more difficult because of its higher bandwidth and therefore an increase in sensitivity to noise. No intrinsic increase in difficulty is encountered in a CW design and in a pulse doppler design a large number of pulses will still be integrated.

There are a number of alternative methods of implementing the basic design which involve changes of detail but not of principle. One example is the means of offsetting the transmitter frequency source from the local oscillator of the radar system.

In the diagrams shown in FIGS. 3 and 4 the transmitter frequency is driven from a source frequency (VCO 30) that does not depend on the expected target doppler frequency, whereas the local oscillator path is created by mixing (53) or (80) with the doppler VCO. An alternative configuration is possible in which the transmitted signal varies with the doppler frequency and the receiver oscillator is kept fixed.

An example of such a design is shown in FIG. 6. This design operates on the discrete tuning principle of FIG. 4 but uses the bank of fixed oscillators as a reference for the L.O. frequency and has a variable transmitter frequency.

There is an additional alternative variation on the main theme where the fundamental RF VCO [(30) on FIGS. 3 and 5] is removed and the mixed output (54) is used to upconvert to the reference frequency. This is a minor variation on these figures.

Referring now to FIG. 6, the design is a modification of that described in FIG. 4.

The RF source consists of a bank of 'N' oscillators (78) and the switches necessary to choose between them (74) and (76) with the selection logic of FIG. 4 combined in one block, incorporating elements (62)-(70). The 'band select logic' receives an input from the phase sensitive detector (44) which gives an output signal approximately proportional to the frequency difference between the input and output signals of the injection locked oscillator (38). The chain of intermediate amplifiers (32) amplify the source signal to sufficient power to injection lock the final oscillator. This part of the design is in common with FIG. 4.

The difference lies in the fact that the RF source frequency is output via the amplifiers (100) and (102) to give a signal that is used in the receiver path to drive the first RF mixers, shown in the simplified block diagram of FIG. 1 as mixer (14), (in FIG. 1 the alternative, bracketed, frequency values apply to the design shown in FIG. 6), instead of the transmitter chain.

An output from the L.O. source is taken via the coupler (101) and mixes (112) with the transmitter reference signal that originates from a Voltage Controlled Oscillator (118). This VCO is amplified (120) to give a signal suitable for the pulsed intermediate amplifiers (32) via the isolator (124), and is also used, via a coupler (122) and a chain of isolators (114) to give the reference transmitter signal to the mixer (112).

The output of mixer (112) which is close to the Doppler VCO frequency is then mixed with that signal (104) in the quadrature mixer (110) to produce a low frequency signal which passes through the integrator (116) to retune the frequency of the VCO (118). The loop is stable when the output of the mixer (110) is zero and this occurs when the VCO (118) is phase locked to the Doppler VCO and required L.O. source.

The logic is controlled by the lock detect PSD (106) which takes the output of the mixer (112) and phase sensitive detects against the doppler VCO (104). If the loop 130 is out of lock there is a beat frequency which indicates an unlocked loop and initiates the search/set-on process (108), via the integrator (116), and the band select logic as shown in FIG. 4 (62) (64) (66) (68) and (70).

We claim:

1. A coherent radar system employing an injection locked oscillator for the generation of a transmitted signal, said oscillator having an injection locking bandwidth within which the oscillator output signal is locked in frequency to the injection signal, the system comprising: a radar source from which said injection signal is derived and feedback means for controlling the frequency of said radar source in dependence upon the phase difference between said injection signal and said oscillator output signal so as to reduce said phase difference and tend to maintain the injection signal frequency at the center of said injection locking bandwidth, said radar source comprising a plurality of fixed frequency oscillators having sequential operating frequencies separated by a fraction of said injection locking bandwidth, selection means for selecting one of said fixed frequency oscillators to determine the frequency of said injection signal, said selection means being responsive to said phase difference in a feedback loop to select said fixed frequency oscillators so as to tend to reduce said phase difference.

2. A radar system according to claim 1, wherein the frequency of the selected fixed frequency oscillator constitutes said injection signal frequency.

3. A doppler radar system according to claim 1, including means providing an intermediate frequency signal from a received signal and a local oscillator signal, wherein the frequency of the selected fixed frequency oscillator constitutes a local oscillator frequency for the system, the system including a further feedback loop including a voltage controlled oscillator providing the injection signal frequency, said voltage controlled oscillator being controlled in dependence upon the difference between, on one hand the doppler shifted intermediate frequency, and, on the other hand, the difference between said local oscillator frequency and said injection signal frequency.

4. A radar system according to claim 3, wherein the doppler shifted intermediate frequency signal and a difference signal having a frequency equal to said difference between the local oscillator frequency and the injection signal frequency are applied to a phase sensitive detector to provide an indication of the lock/out-of-lock condition of the feedback loop.

5. A radar system according to claim 4 including means responsive to an indication of an out-of-lock condition to sweep said voltage controlled oscillator to a frequency at which the further feedback loop acquires a lock condition.

6. A frequency agile radar system according to claim 1, wherein said injection locked oscillator is tunable over the range of frequency agility and said fixed frequency oscillators have operating frequencies throughout said range of frequency agility, the system including selection logic means for selecting said fixed frequency oscillators on a random or predetermined basis and selecting said output frequency of said injection locked oscillator in correspondence with the selected fixed frequency oscillator, said feedback loop being a first feedback loop including a phase sensitive detector responsive to said phase difference to control a tunable voltage controlled oscillator, and the system including a further feedback loop including a further voltage controlled oscillator providing the radar source frequency, said further voltage controlled oscillator being controlled in response to the difference between the frequency of the selected fixed frequency oscillator and the frequency of said tunable voltage controlled oscillator, the arrangement being such that for each selected fixed frequency oscillator the tunable voltage controlled oscillator is controlled to maintain said radar source frequency within the injection locking bandwidth of the injection locked oscillator.

7. A pulsed radar system according to claim 1, comprising at least one amplifier stage between said radar source and said injection locked oscillator and timing means for pulsing the operation of said amplifier stage and said injection locked oscillator in synchronism.

8. A continuous wave radar system according to claim 1.

9. A radar system according to claim 1, wherein said feedback means comprises a first loop including a phase sensitive detector and a tunable voltage controlled oscillator constituting part of said radar source, said radar source further including a relatively pure spectrum fixed frequency oscillator and a further voltage controlled oscillator controlled in a further feedback loop to produce an output frequency equal to the difference between said fixed frequency and said tunable voltage controlled oscillator, said output frequency being the said radar source frequency, and the spectrum of said fixed frequency oscillator being imposed upon the radar source signal.

* * * * *